United States Patent [19]

Young

[11] Patent Number: 5,113,901
[45] Date of Patent: May 19, 1992

[54] SEWER RELIEF VALVE

[76] Inventor: Jack W. Young, 5510 E. 20th St., Tucson, Ariz. 85711

[21] Appl. No.: 756,582

[22] Filed: Sep. 9, 1991

[51] Int. Cl.⁵ .............................................. F16K 37/00
[52] U.S. Cl. .................................... 137/554; 137/558; 251/65
[58] Field of Search ................. 137/554, 558, 392; 251/65

[56] References Cited

U.S. PATENT DOCUMENTS

| | | | |
|---|---|---|---|
| 2,965,117 | 12/1960 | Gallacher | 251/65 |
| 3,202,165 | 8/1965 | Yavicoli | 137/558 |
| 3,339,578 | 9/1967 | Smith | 137/558 |
| 4,207,912 | 6/1980 | Ichikawa | 251/65 |
| 4,469,304 | 9/1984 | Kah, Jr. | 251/65 |
| 4,569,312 | 2/1986 | Riddel et al. | 137/558 |
| 4,612,949 | 9/1986 | Henson | 137/554 |
| 4,777,979 | 10/1988 | Twerdochlib | 137/554 |
| 4,805,665 | 2/1989 | League | 137/554 |
| 4,874,012 | 10/1989 | Velie | 137/554 |

*Primary Examiner*—A. Michael Chambers
*Attorney, Agent, or Firm*—Antonio R. Durando; Harry M. Weiss

[57] ABSTRACT

An electronically operated sewer backup alarm apparatus can be placed in a new or existing sewer line connecting a residence, or other facility generating sewage, to a sewage collection system. The alarm apparatus includes a connection element for connection into the sewer line, an electrical apparatus controlling the closing of the back-water valve, a flapper attached in a water tight relationship to the seat of the back-water valve. The flapper also has an "O" ring for sealing the flapper to the seat of the back-water valve, whereby backed up sewage in the sewer pipe is prevented from entering into the residence or other type facility. The backup alarm system also includes first and second electrical conductors extending into the interior of the connection element for electrically contacting backed-up sewage to produce reduced electrical resistance between the first and second conductors. An alarm circuit generates an alarm signal in response to a reduced resistance to actuate an audible buzzer.

5 Claims, 2 Drawing Sheets

PRIOR ART

SEWER RELIEF VALVE

BACKGROUND OF THE INVENTION

In the installation of sewer pipes connecting residence or other commercial buildings with a central sewage system, such as a city sewer line, problems may develop in the sewer line that result in the sewer line becoming filled with sewage and waste water. These problems may be caused by the central sewer system stopping up and thereby backing into the sewer pipe between the residence and the sewer system. In this case, it is common for sewage to fill the pipes back into the residence, and to leak out on the floor of the building creating an undesirable and unsanitary situation.

It is common practice in plumbing construction to locate between the residence and the central sewage collection point a device known as a back water valve when the lowest plumbing fixture, in the residence or building facility, is lower than the upstream man hole cover. This back water valve is required to block backed up sewage from entering into the building through the sewage system. This device suffers from the deficiency that while it is supposed to block sewage being backed up, it sometimes traps solid material between its flapper and seal, which allows sewage to bypass and in turn allows the building to be flooded with sewage.

It is obvious then, that there is a need for a device which will block sewage backup, but will not interfere with, or trap, debris which is in the sewage.

SUMMARY OF THE INVENTION

Applicant's invention provides a device whereby which, when installed in a sewer pipe between the residence or other facility and the central sewage system will provide an alarm when sewage is backing up into the sewer pipe and into the back-water valve. The device also provides for a positive means of blocking backed up sewage from entering into the residence or other facility. This is accomplished by means of a flapper member with a neoprene "O" ring engaging a seat creating a water tight seal.

Additionally, the flapper is held out of normal sewage flow to prevent obstruction of sewage and debris by means of magnetic bond of two magnets, one attached to the flapper member and the other attached to a moveable rod which is part of a solenoid controlled by sensors inside valve body. These sensors, along with sounding an alarm, also let an electronic control unit know that sewage has started backing up into back-water valve, energizing the solenoid which breaks the magnetic bond allowing the flapper member to close and prevent sewage from backing into facility. It is the object of this invention, therefore, to prevent sewage from backing up into the residence or facility caused by debris caught between the valve's flapper and seat which would prevent a water tight seal.

It is a further object to provide a water tight seal when blocking backed up sewage by means of a neoprene "O" ring.

It is still a further object of the present invention to provide means by which an indication is given the residence occupant of sewage backing up in the sewer line.

DETAILED DESCRIPTION OF PREFERRED EMBODIMENT

Figure 3:
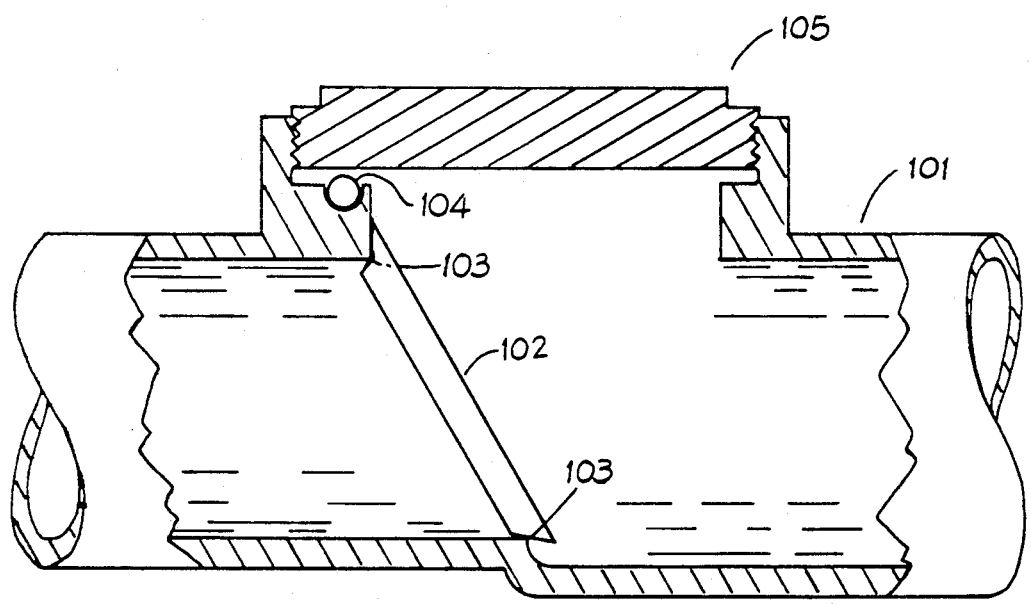
FIG. 3 is a cross sectional view of the prior art showing the conventional flapper method.

Referring to FIG. 3, the prior art illustrating the old flapper and seat style back-water valve which is to be installed in the sewer line is shown in a cross sectional view. These valves are located in the sewer pipe which runs from the house to the central street sewer line (sometimes in the interior but generally on the exterior of the house). Shown in cross section is a section of the back-water valve (101). Inside the back-water valve is a flapper member (102) which rests against the seat (103) of the back-water valve body. Flapper member (102) is hinged in the back-water body (101) at hinge point (104). Flapper member (102) is held in hinge point (104) by the coded cap (105). The hinged flapper member (102) is intended to allow a free flow of sewage from the residence to the street sewer by means of sewage forcing the flapper member open by lifting it upward as a result of the force exerted flowing sewage. In turn, it is also intended that flapper member (102) will block all sewage that is backing up from the street sewage as a result of the flapper member (102) being closed against the seat (103). This does not always happen due to debris in the sewage that becomes caught between the flapper member (102) and the seat (103) preventing the flapper member (102) and the seat (103) from making a water tight seal.

This condition allows sewage to pass between the flapper member (102) and the seat (103) into the residence or facility creating a flooded condition.

Figure 1:
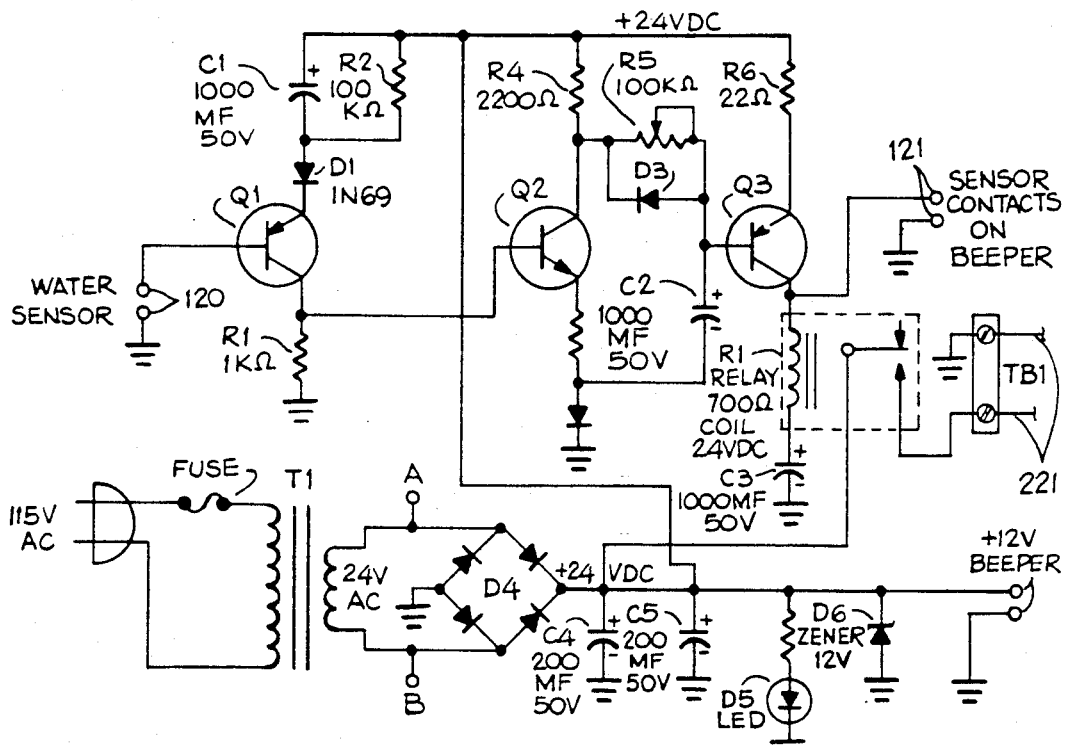
FIG. 1 is an electrical schematic diagram of the sewage level sensing and control unit.
Figure 2:
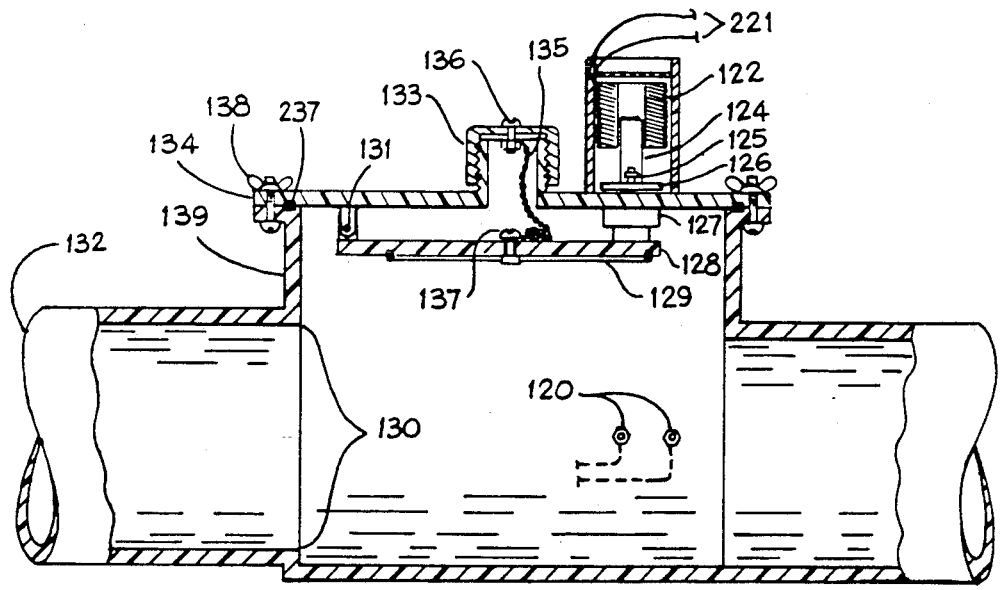
FIG. 2 is a cross sectional view of the subject invention.

Applicant's invention, a cross sectional view of which is shown in FIG. 2, is designed to give warning of this problem. Referring now to FIGS. 1 and 2 the electrical control unit operates when the transformer (T1) is activated by plugging in its primary 115 volt AC lead into a wall socket. The 24 volt AC outlet of transformer (T1) is full wave rectified by a full wave bridge (D4). When the water sensor buttons (120) are submerged in backed up sewage, the sewage makes a closed circuit between the sensor buttons (120) allowing current to flow through the base of transistor (Q1), turning on transistor (Q1), which in turn allows current to flow to the base of transistor (Q2). This turns on transistor (Q2), which creates a low voltage situation at the base of transistor (Q3), which itself is turned on. When transistor (Q3) is on, it allows current to flow to the sensor contacts on beeper (121) and current to flow through the coil of the relay (R1) to the capacitor (C3). This momentarily closes the contacts in relay (R1) directing current, momentarily, to solenoid (122) through the terminal board (TB1) and through the wiring (221). At this point, the plunger rod (124) is drawn up into the solenoid (122), at the same time lifting up the magnet (126) which is attached to the plunger (124) by pin (125). This breaks the magnetic bond between magnet (126) and magnet (127), which is glued permanently to flapper (128). When the magnetic bond is broken, flapper (128) swings down and seals off inlet (132), by means of the O-ring (129), against the permanent seal seat (130). The O-ring (129) is recessed into the flapper (128) and glued. The flapper (128) and O-ring (129) strike the seal (130) exactly at the correct point because of the permanent mounted position of the pivot point (131). Flapper (128) pivots on a ⅛" brass rod at pivot point (131) allowing a smooth and exact swing to insure proper contact of the O-ring (129) against the seal seat (130). This is to insure that sewage will not back up through the inlet (132) and into the residence or building.

After a sewage back up problem has been corrected, the flapper (128) can be reset to its normal position by unscrewing the one-inch PVC pipe cap (133) from cover plate (134) and pulling up the flapper (128) by means of a chain (135) which is attached to the cap (133) by screw (136) and attached to the flapper (128) by screw (137). Lifting flapper (128) up all the way with cap (133) will allow the magnet (127) to form a magnetic bond with magnet (126) the two magnets being separated only by the thickness of the cover plate (134), which does not interfere with the magnetic bond created by the two magnets (126) and (127).

The cover plate (134) is seated to valve body (139) by means of an O-ring (237) installed in a groove around the edge of cover plate (134).

The cover plate (134) is held down to the valve body (139) by means of ten (10) evenly spaced brass screws and wing nuts (138). The cover plate (134) may be removed for cleaning or repair. Precision drill holes for screws (138) insure that the cover plate will be installed in the exact same place as prior to removal.

While a preferred embodiment of the invention has been shown and described, it is appreciated that the scope of the invention is not to be limited, except as defined in the appended claims.

I claim:

1. A device for providing an alarm and for blocking backed-up sewage when the contents of an obstructed sewer line back up into residential and other buildings, comprising:
    - a valve housing, consisting of a plain T-fitting including a substantially horizontal segment of pipe for connection with a standard sewer-line pipe and including a flanged opening, protruding upwards perpendicularly to said segment of pipe, for access to the interior of said housing;
    - a cover plate, removably attached to said flanged opening;
    - a valve seal seat, disposed within said segment of pipe normal to the direction of flow of material passing through said valve housing;
    - a valve flapper, hinged to said cover plate and capable of assuming a substantially horizontal position, wherein said valve seal seat is open, and a substantially vertical position, wherein the valve flapper seals said valve seal seat and provides blockage for any material backing up the sewage line;
    - a solenoid, attached to said cover plate, including a removable core consisting of a plunger rod affixed to a first magnet, said solenoid being positioned so as to permit the upward travel of said plunger rod and provide upward motion to said first magnet when the solenoid is energized;
    - a second magnet, affixed to said valve flapper in a position minimizing its distance from said first magnet when the solenoid is not energized and when the valve flapper is in a substantially horizontal position, so that said first and second magnets exert sufficient attraction force on each other to keep the valve flapper in the substantially horizontal position;
    - two electrically conductive sensor buttons, penetrating the wall of said segment of pipe at a location above the normal level of the fluid flowing through said valve housing, said sensor buttons providing a normally-open electrical switch that becomes closed when a conductive path between them is established by the presence of fluid produced by the rising level of said fluid flowing through said valve housing;
    - electrical means, connected to said sensor buttons, for energizing said solenoid and cause said plunger and first magnet to move upward, thus disconnecting the first magnet from said second magnet and permitting the two to become separated, which in turn frees the movement of the valve flapper and permits it to swing downward and meet said valve seal seat to provide blockage for any material backing up the sewage line; and
    - alarm means, connected to said electrical means for energizing said solenoid, for alerting a user of the device when said solenoid is caused to be energized by the rising level of said fluid flowing through said valve housing.

2. The device described in claim 1, further comprising a removable cap incorporated into said cover plate and a segment of chain having two ends, the first end being attached to said removable cap and the second end being attached to said valve flapper, so that the valve flapper can be pulled to its substantially horizontal position by removing said cap and pulling on said chain.

3. The device described in claim 1, further comprising an O-ring affixed to said valve flapper to improve the seal between the valve flapper and said valve seal seat.

4. The device described in claim 1, further comprising an O-ring affixed to said cover plate to improve the seal between the cover plate and said flanged opening, wherein the cover plate is attached to the flanged opening by a multiplicity of removable fasteners.

5. The device described in claim 1, wherein said alarm is an audible beeper.

* * * * *